(12) United States Patent
Lee et al.

(10) Patent No.: US 6,639,628 B1
(45) Date of Patent: Oct. 28, 2003

(54) APPARATUS AND METHOD FOR PROCESSING COLOR IMAGES

(75) Inventors: Seong-deok Lee, Suwon (KR); Chang-Young Kim, Uiwang (KR); Du-sik Park, Pohang (KR); Yang-seock Seo, Seoul (KR); Jeong-yeop Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/425,674

(22) Filed: Oct. 22, 1999

(30) Foreign Application Priority Data

Oct. 22, 1998 (KR) ............................................. 98-44351

(51) Int. Cl.$^7$ ........................... H04N 9/73; H04N 17/00; G09G 5/00
(52) U.S. Cl. .................... 348/223.1; 348/655; 348/184; 345/603; 345/604
(58) Field of Search ........................ 348/223.1, 222.1, 348/272, 277, 231, 655, 577, 184, 588, 239, 649; 345/603, 604

(56) References Cited

U.S. PATENT DOCUMENTS

| | | | |
|---|---|---|---|
| 4,616,253 A | | 10/1986 | Hashimoto et al. |
| 4,685,071 A | | 8/1987 | Lee |
| 4,805,010 A | | 2/1989 | Shroyer et al. |
| 5,495,428 A | | 2/1996 | Schwartz |
| 5,550,587 A | * | 8/1996 | Miyadera .................. 348/223.1 |
| 5,612,738 A | * | 3/1997 | Kim ......................... 348/223.1 |
| 5,668,596 A | * | 9/1997 | Vogel ....................... 348/222.1 |
| 5,691,772 A | * | 11/1997 | Suzuki ..................... 348/223.1 |
| 5,805,213 A | * | 9/1998 | Spaulding et al. ........ 348/222.1 |
| 5,920,358 A | * | 7/1999 | Takemura ................... 348/655 |
| 5,956,015 A | * | 9/1999 | Hino ........................... 345/600 |
| 6,160,581 A | * | 12/2000 | Higashihara et al. ........ 348/364 |
| 6,324,695 B1 | * | 11/2001 | Lee et al. ...................... 725/38 |
| 6,459,449 B1 | * | 10/2002 | Juen ......................... 348/223.1 |
| 6,476,877 B2 | * | 11/2002 | Kihara et al. ................ 348/650 |

* cited by examiner

*Primary Examiner*—Lin Ye
(74) *Attorney, Agent, or Firm*—Burns, Doane, Swecker & Mathis, L.L.P.

(57) ABSTRACT

An apparatus and method for processing color images are provided. The apparatus includes a color conversion unit for white-transforming signals in RGB space. The color conversion unit includes a first white-transforming means for white-transforming signals in RGB space to signals in a predetermined color space using N predetermined illuminant colors, and a second white-transforming means for white-transforming the signals in the predetermined color space to the signals in RGB space using M predetermined color temperatures of the display means, so that a natural color image or an image of a desirable color can be obtained without information with respect to the illuminant.

28 Claims, 9 Drawing Sheets

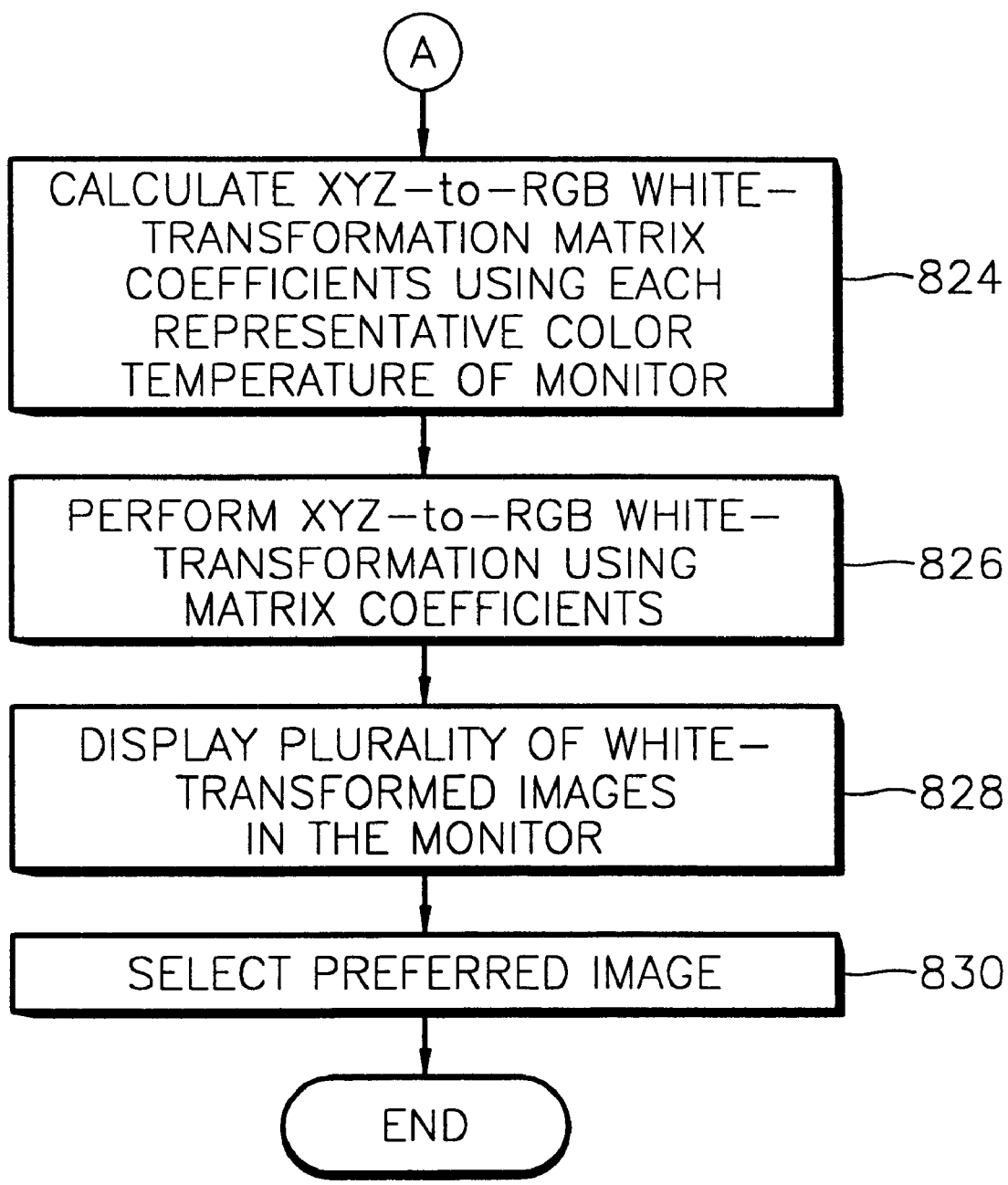

APPARATUS AND METHOD FOR PROCESSING COLOR IMAGES

This application claims priority under 35 U.S.C. §§119 and/or 365 to 98-44351 filed in Korea on Oct. 22, 1998; the entire content of which is hereby incorporated by reference.

BACKGROUND OF THE INVENTION

1. Field of the Invention

The present invention relates to an apparatus and method for processing images, and more particularly, to an apparatus and method for processing color images.

2. Description of the Related Art

In the field of color image processing and color devices, when someone photographs a scene using a color image input device such as a camera and reproduces the photographed image data using an image output device such as a monitor, or when a display image is downloaded from the Internet, it is important that the color of the reproduced image corresponds with the color of the actual scene. To achieve this, it is an essential point that one obtain the color of an illuminant for illuminating an object (scene illuminant), then a reference white point of the image input device corresponds with the color of the illuminant, and that one processes the illuminant color in the white point of an image to be reproduced and in the color temperature of an display device, which reproduce the image.

In most general cameras, all circuits of the cameras are adjusted using one or two reference illumination sources, therefore, there are problems that when an object is photographed under illuminants other than the reference illuminant, the color of the image reproduced by the image output device is different from that of the scene image, and that as the difference of illuminant colors or color temperatures between the reference illuminant of the camera and the scene illuminant becomes greater, the difference in colors between the reproduced image and the object becomes greater. Also, there is a problem that even if the illuminant of the object corresponds with the reference illuminant of the camera, in the case that the illuminant of the object is different from the color temperature of a cathode ray tube of a monitor on which the image photographed by the camera is displayed, color variation due to the difference of the color temperature may occur.

As a common conventional method of matching the color of an actual scene image with the color of reproduced image, a user adjusts color tone, luminosity and color saturation of the three primary colors of red, green and blue (RGB) on the monitor with the help of image processing software, such as Photoshop of Adobe Co., so that the user can see that the colors of the scene image match those of the reproduced image.

However, it is generally difficult to obtain an optimum RGB rate for color matching between two images, and more difficult to overcome problems due to imbalance of illuminants which used for adjustment of colors, by color adjustments.

A method for matching the color of the scene illuminant with the white balance of the image input device, which are essential for matching the colors of two images, is partially adopted by the camera. For instance, a method using an optical sensor is disclosed in U.S. Pat. Nos. 4,616,253 and 4,805,010. In these patents, optical sensors for detecting illuminant color components irradiating an object are installed in the camera, or are provided as independent devices. A user obtains color coordinates of the illuminant color emitted from the illumination source by the sensors, and sets camera reference illuminant as white balance measured by the sensor based on the obtained color coordinates to thereby obtain an optimum scene image. However, this method has problems of increased costs due to use of the optical sensor, and of difficulties in adopting to images from distant areas where sensors cannot be installed. Also, there is a restriction that the camera should be a high-class goods, which is possible to perform a white balance control. Further, there is a disadvantage that color matching of color images formed by input devices other than a pre-specified camera cannot be accomplished.

A conventional method for estimating illuminant colors regardless of the type of image input device is disclosed in U.S. Pat. No. 4,685,071. According to this method, illuminant colors are detected from the color image itself. That is, according to the method, in order to detect a change of colors having independent brightness using specularly reflected light (highlight) from an image, an image is converted to a color coordinate space having a chromaticity coordinate. Then, a color boundary where both color saturation and color tone are most abruptly changed, is detected, and the illuminant color is detected using data sets around the boundary due to a change of the color saturation. Here, for determining the boundary causes from the change of the color saturation or the change of the color tone, the data sets around both sides of the boundary point are collected, and then the collected data sets are linearly approximated. If the inclinations of the straight lines obtained by the data sets collected from both sides are equal, it is determined that the boundary is caused by the color saturation and uses the data sets for detecting illuminant color, and a variable determined as the illuminant color is obtained by a path of intersecting points of the straight lines obtained from the data sets around the boundary due to the change of the color saturation. But, the above method has a disadvantage that it requires an excessively long processing time.

Also, there are other disadvantages in that it is not easy to collect the data sets from either side of each of the boundary points, and that because the data sets are processed in unit of a boundary point unit, collecting of data on both sides from various boundary points, linear approximating, comparing, and determining must be iterated. Also, there is a problem that various effective highlights for calculation of illuminant colors must exist on the chromaticity.

Another conventional method is disclosed in U.S. Pat. No. 5,495,428. According to the method, image data is projected onto a chromatic space histogram to find a straight line which is an impetus for determining an illuminant color, straight lines with respect to each of clusters are calculated on the chromatic space, and the chromatic values at positions where the straight lines converge are obtained. Although detecting a change of boundaries in the above method is not complicated method of, straight lines with respect to all clusters must be calculated which requires much time. Also, when the colors of objects in the image are similar, the clusters may make a lump to thereby deteriorate precision, and stable illuminant colors require the existence of strong highlight information in the image.

FIG. 1 is a block diagram of the structure of a typical image processing system for illustrating various processes of generating and reproducing an image. Referring to FIG. 1, a scene of a person standing next to a tree irradiated by an arbitrary illuminant. The scene can be photographed by a camera set to an arbitrary reference illuminant having color temperature of 5000 K, or 7500 K. Also, an image printed in the form of a silver salt photograph can be read by an image scanner having an illuminant of color temperature of 2800 K. Also, the image may be download from an Internet site in which case the image input device cannot be defined. The image data obtained by the above-mentioned methods are displayed on an arbitrary image output device by a computer or an image processing device. Here, color temperatures of monitors may be set differently. That is, the scene image is sole, but images displaying on the monitor may have different colors due to difference from that of the image input device, and a difference in color temperatures between image data having an arbitrary light source and a monitor.

SUMMARY OF THE INVENTION

It is an object of the present invention to provide an apparatus for processing color images by which the difference in colors between a actual scene and a reproduced image of the scene can be stably matched regardless of the components of the image, and the types of the image input device.

It is another object of the present invention to provide a method for processing color images which is used in the apparatus for processing color images.

Accordingly, to achieve the first object, the apparatus for processing color images, which receives RGB signals output from an image input device and processes the received RGB signals to thereby output images to a display means, comprising: a color conversion unit for white-transforming signals in RGB space; wherein, the color conversion unit includes, a first white-transforming means for white-transforming signals in RGB space to signals in a predetermined color space using N predetermined illuminant colors; and a second white-transforming means for white-transforming the signals in the predetermined color space to the signals in RGB space using M predetermined color temperatures of the display means.

Preferably, the color image processing apparatus further comprises: a first frame memory means for buffering the received RGB signals and outputting the buffered signals; an image sampling unit for receiving the RGB signals output from the first frame memory means and down-sampling the received RGB signals and further outputting a down-sampled RGB signals; and a second frame memory means for buffering the down-sampled RGB signals and outputting the buffered down-sampled RGB signals.

It is also preferable that the color conversion unit comprises: a first operation unit including N matrix operators connected in parallel to calculate matrices for white-transformation of the signals in RGB space to signals in predetermined color space using N predetermined illuminant colors.

It is further preferable that the color conversion unit further comprises: a second operation unit including M matrix operators connected in parallel to calculate matrices for white-transformation of the signals in the predetermined color space to the signals in RGB space using each M predetermined color temperature.

Preferably, the color conversion unit comprises a first memory for storing information of the matrices for performing white-transformation of the signals in RGB space to the signals in a predetermined color space using N predetermined illuminant colors, and outputting the information in response to a first control signal, and a first matrix operation unit for operating the matrices in accordance with the information output from the first memory. The color conversion unit further comprises: a second memory for storing information of the matrices for performing white-transformation the signals in the predetermined color space to the signals in a RGB color space using M predetermined color temperature for display means, and outputting the information in response to a second control signal, and a second matrix operation unit for operating the matrices in accordance with the information output from the second memory. The predetermined color space is a standard color space and the predetermined space is a color space which has a relationship that the magnitude of the transformed signal in the color space and the magnitude of signal in original color space is linear.

The N predetermined representative illuminant colors of the color conversion unit are obtained by selecting at least one color temperature from a group consisting of 2800 K, 4300 K, 5000 K, 5500 K, 6500 K, and 7500 K, which can be easily distinguished by person's eyes, and are frequently used in ordinary.

The color conversion unit converts a light source using Formula 9, when the color temperature of the illuminant is known.

To achieve the second object, the method for processing color images includes the steps of: (a) white-transforming signals in RGB space using N predetermined eliminant colors; (b) displaying a plurality of images by the white-transformed signal on the display means; (c) selecting the most visually preferred image from the images; and (d) determining the illuminant color corresponding to the selected image in step (c) as optimum illuminant color.

Preferably, the step (a) includes: (a-1) white-transforming signals in RGB space to signals in a predetermined color space using N predetermined illuminant colors; and (a-2) white-transforming the signals in the predetermined color space to the signals in RGB space using M predetermined color temperatures.

It is also preferable that the N predetermined representative illuminant colors in step (a) are obtained by selecting at least one color temperature from the group consisting of 2800 K, 4300 K, 5000 K, 5500 K, 6500 K, and 7500 K, which can be easily distinguished by men's eyes, and are frequently used in routine life.

It is further preferable that the predetermined space in step (a) is a color space which has a relationship that the magnitude of transformed signal in the color space and the magnitude of signal in original color space is linear.

The predetermined color space in step (a) is a color space selected from the group of standard color spaces recommended by CIE, CIEXYZ, CIEUVW, and color spaces adopt UV chromaticity coordinate space and Y, R-Y, B-Y coordinate space.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
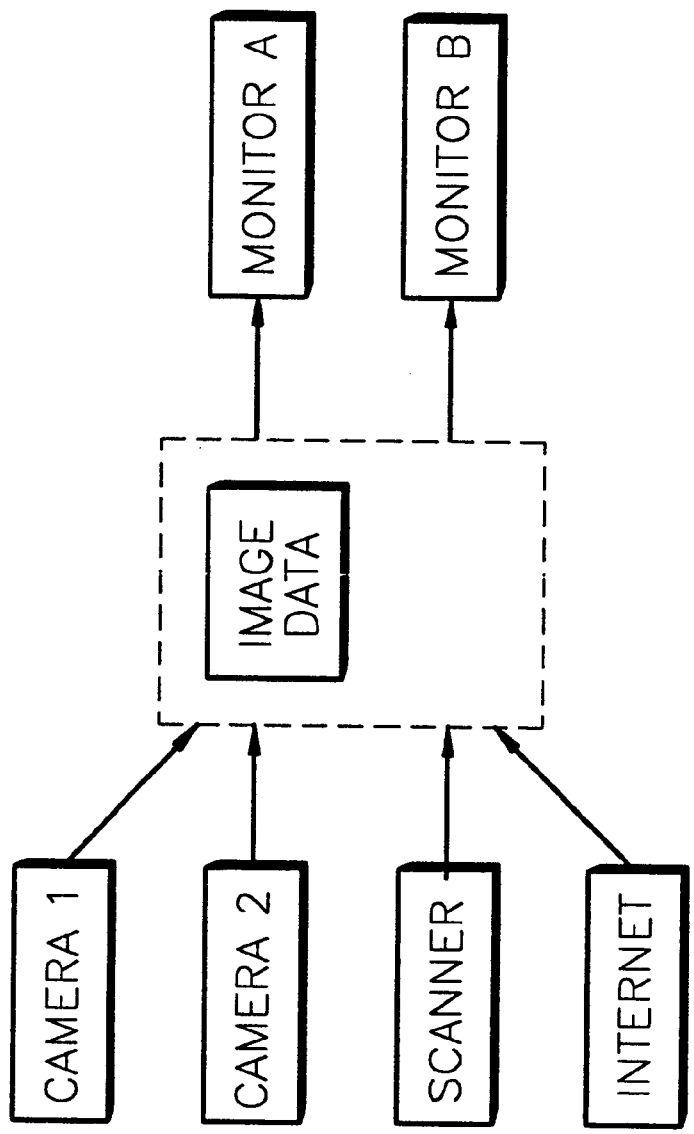
FIG. 1 is a block diagram of a structure of a typical image processing system for illustrating various processes of generating and reproducing an image.
Figure 1:
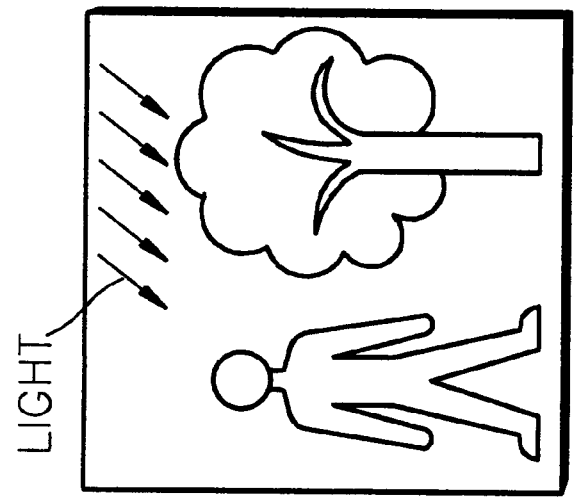
Figure 2:
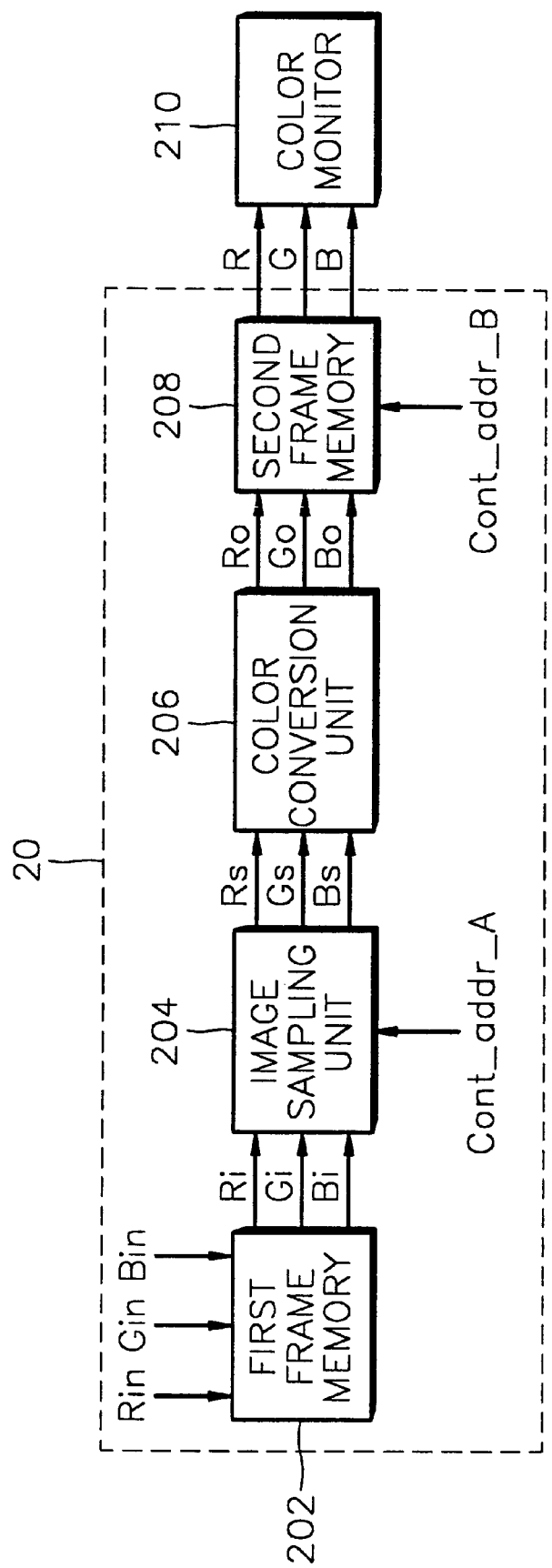
FIG. 2 is a block diagram of a structure of a color image processing apparatus according to the present invention.

Referring to FIG. 2, a color image processor 20 according to the present invention includes a first frame memory 202, an image sampling unit 204, a color conversion unit 206, and a second frame memory 208.

In the operation of the color image processor 20, the first frame memory 202 buffers first red, green and blue (RGB) signals Rin, Gin and Bin of the input three primary colors and outputs the buffered signals. The image sampling unit 204 receives the first RGB signals output from the first frame memory and down-samples the received first RGB signals to output second RGB signals. For instance, when the image resolution of the input first RGB signal is 640 (width)×480 (height), and the resolution of a color monitor 210 is 1280 (width)×1024 (height), and six or eighteen comparison images are displayed on the color monitor 210, the down sampling rate of the image sampling unit 204 is determined according to a control signal Cont_addr_A of a microcomputer (not shown).

In other words, the image sampling unit 204, converts the resolution of the input image to a degree appropriate for the output device and outputs the image with the converted resolution to the color conversion unit 206. In the image sampling unit 204, if necessary, the function of passing images without down-sampling can be performed under the control of the microcomputer.

The color conversion unit 206 performs white-transformation of down-sampled RGB signals in standard color space, using 6 predetermined representative illuminant colors, and performs white-transformation of each white-transformed signal in standard color space to signals in RGB color space using 3 predetermined representative color temperatures of monitor 210. Thus, color conversion unit 206 outputs 6×3=18 kinds of white-transformed images using different illuminant color of illuminant and color temperature of display.

The second frame memory 208 stores 18 images in response to the second control signal Cont_addr_B from a micro-computer (not-shown) respectively, then outputs the stored images to the monitor 210.

Figure 3:
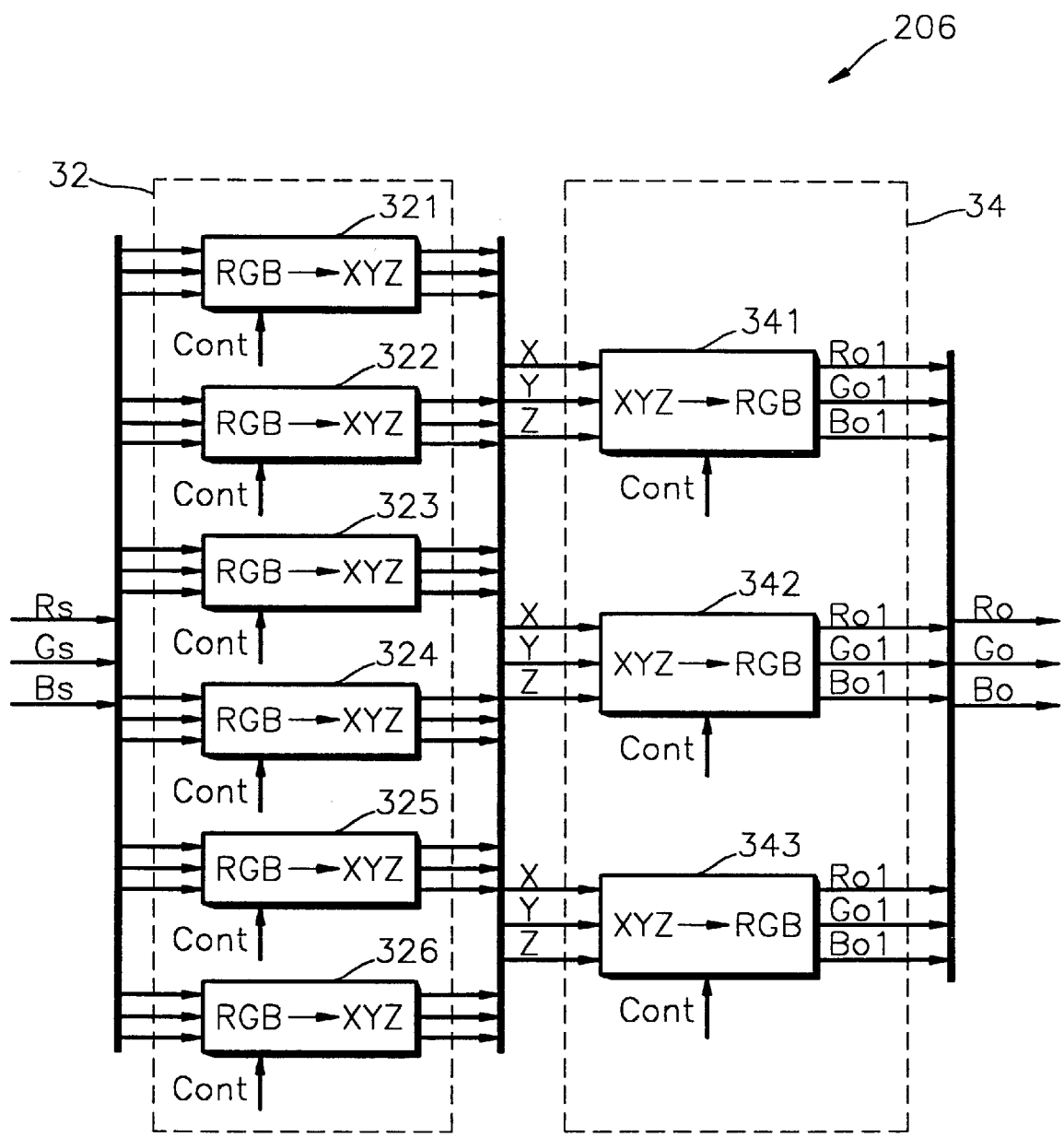
FIG. 3 is a block diagram of a structure of a color conversion unit of the device of FIG. 2.

FIG. 3 shows the detailed structure of the color conversion unit 206. Referring to FIG. 3, the color conversion unit 206 includes first operation unit 32 and second operation unit 34. The first operation unit 32 includes six matrix operators 321, 322, 323, 324, 325 and 326. The matrix operators 321, 322, 323, 324, 325 and 326 are connected in parallel. The matrix operators 321, 322, 323, 324, 325 and 326 calculate matrices which convert a signal in RGB space to a signal in XYZ space using the six representative illuminant colors.

The second operation unit 34 includes three matrix operators 341, 342 and 343. The matrix operators 341, 342 and 343 are connected in parallel. The matrix operators 341, 342 and 343 calculate matrices which convert a signal in XYZ space to a signal in RGB space using three different color temperatures of a display means.

The matrix operators 321, 322, 323, 324, 325, and 326 and the matrix operators 341, 342, and 343 perform matrix operation in response to the control signal Cont from the micro-computer(not-shown). The matrix operators 321, 322, 323, 324, 325, and 326 use different matrix coefficients corresponding to the six illuminant colors when they perform matrix operation for converting a signal in RGB space to a signal in XYZ space. The matrix operators 341, 342, and 343 use different matrix coefficients when they perform matrix operation for converting a signal in XYZ space to a signal in RGB space.

Consequently, eighteen images are displayed on the display monitor by a combination of six illuminant colors with respect to the illuminant and three color temperature with respect to the display monitor. User selects a visually preferred image. By this, the illuminant color of illuminant and the color temperature of display means used when white-transformation of corresponding image is performed are determined to be the optimum illuminant color of illuminant and color temperature.

In the above embodiment, it has been explained that the color conversion unit 206 of the color image processing apparatus according to the invention perform white-transformation between RGB color space and CIEXYZ color space. However, the signal in RGB color space can be transformed to a signal in a another predetermined color space. Preferably, the predetermined space is a color space that relationship between a magnitude of transformed signal in a color space and a magnitude of original in a color space is linear. As the color space, CIEUVW color space can be adopted. Also, as the predetermined color space, color coordinate adopted by Y, R-Y and B-Y, which have been widely used for the industry of color images may be used. Alternatively, it is possible to perform white-transformation between RGB space and rg chromaticity space.

Figure 4:
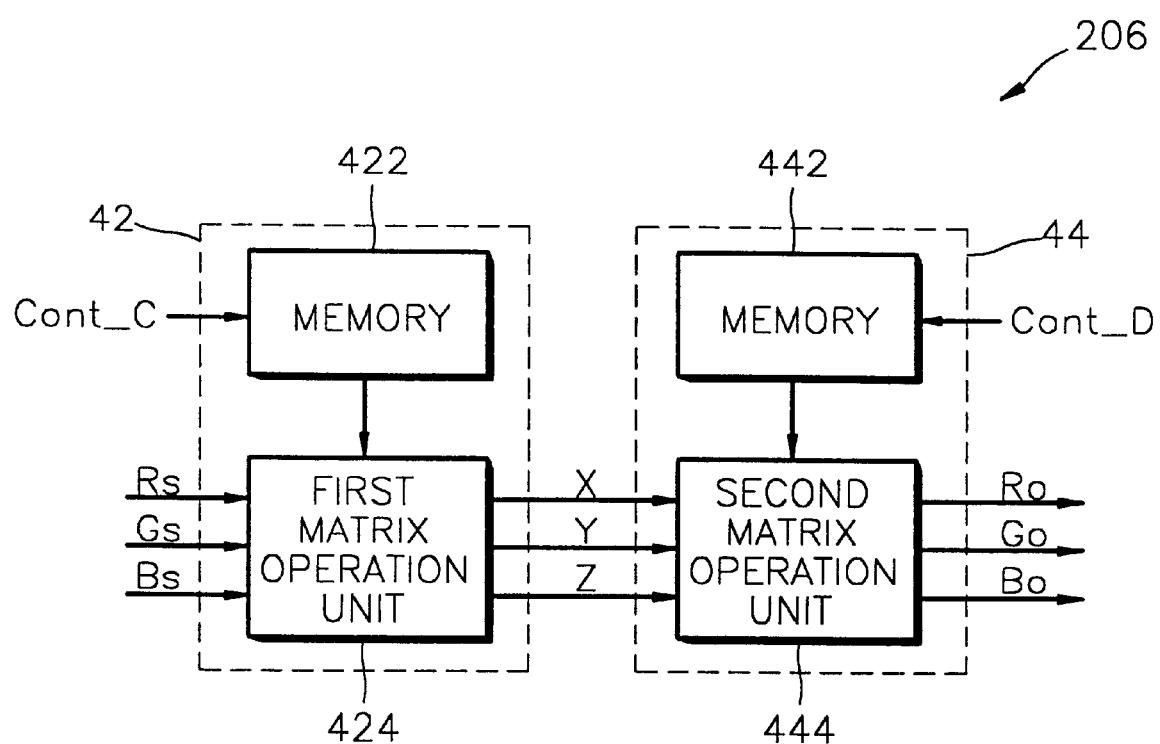
FIG. 4 is a block diagram of another structure of a color conversion unit of the device of FIG. 2.

Meanwhile, It is undesirable that embodied as matrix operators for every matrices are used. FIG. 4 shows a more preferred; example of the structure of the color conversion unit 206. Referring to FIG. 4, the color conversion unit 206 includes a first operation unit 42 and a second operation unit 44. The first operation unit 42 includes a first memory 422 and a first matrix operation unit 424. The matrix coefficients for the first matrix operation unit 424 with respect to the representative illuminant color are downloaded from the first memory 422 in response to a microcomputer control signal Cont_C, and the matrix coefficients for the second matrix operator 444 with respect to the representative illuminant color are downloaded from the second memory 442 in response to a microcomputer control signal Cont_D. Thus, the first matrix operation unit 42 converts signals in RGB space to signals in XYZ space, and the second matrix operation unit 44 converts signals in XYZ space to signal in RGB space.

Now, it will be described how to select representative illuminants and to perform white-transformation.

Human eyes are insensitive to a change of colors of an object in accordance with a change of illuminant, which is generally known as the theory of color constancy. However, in a color image input device such as a camera, the ratio of tristimulus values is greatly changed in accordance with the spectrum of the illuminant irradiating the object (illuminant color).

$$X_k = \Sigma E(\lambda) S(\lambda) r_k(\lambda) \Delta\lambda, k=1-3 \quad (1)$$

The color of an image is expressed by tristimulus values such as RGB or CIEXYZ (XYZ). That is, the color of the image is expressed by the sum of multiplication of the degree of spectral reflection $S(\lambda)$ of the surface of an object, the spectrum $E(\lambda)$ of the illuminant, and a sensor spectrum characteristics $r_k(\lambda)$. Thus, illuminant components such as illuminant colors of Formula 1 act as main components effecting the reproduction of colors.

Figure 5:
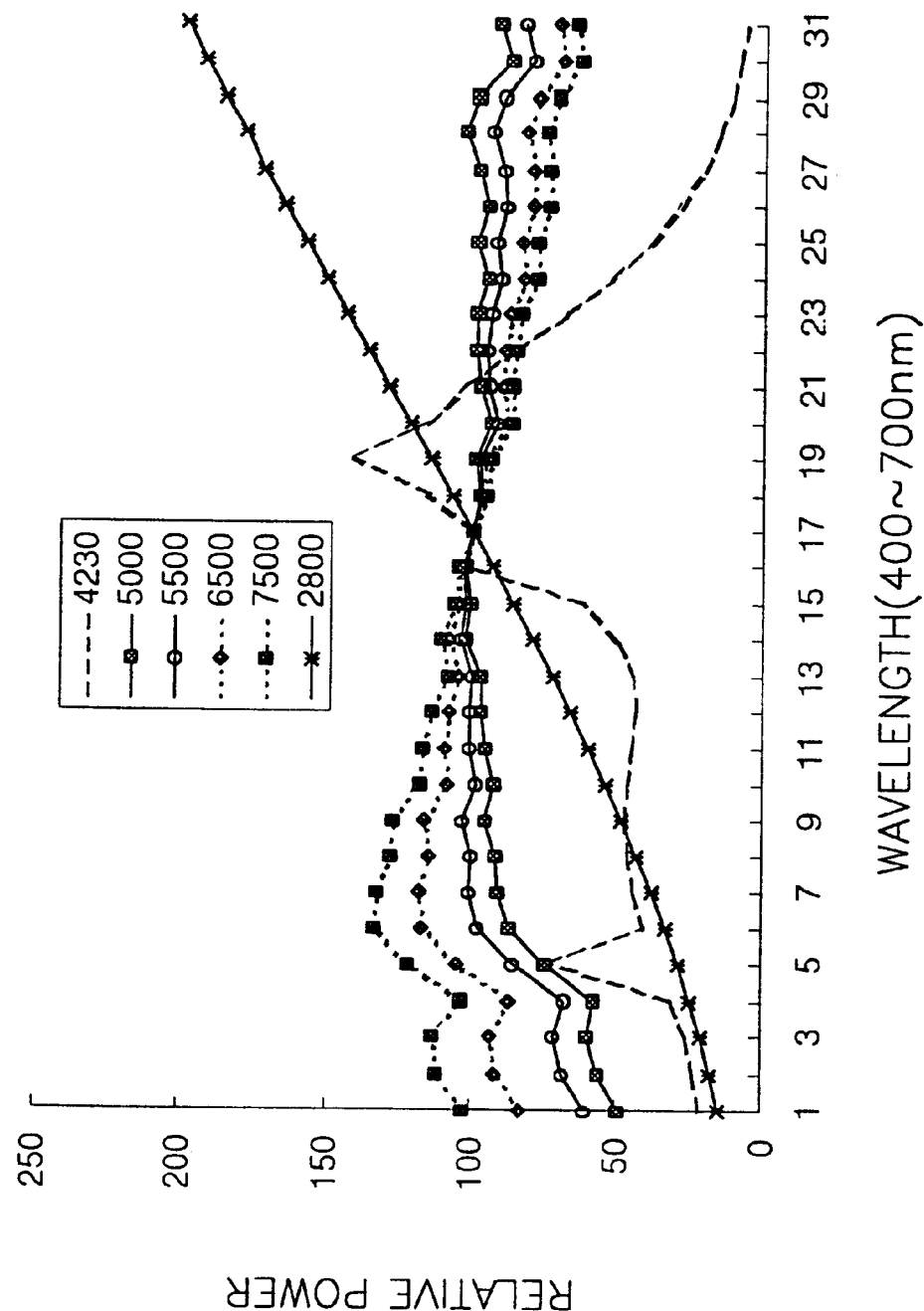
FIG. 5 shows a spectral distribution of representative illuminant adopted by a color image processing apparatus according to an embodiment of the present invention.

The spectral distribution of representative illuminants adopted by the color image processing apparatus according to the embodiment of the present invention is shown in FIG. 5. Referring to FIG. 5, there are six types of illuminant used for the color image processor according to the embodiment of the present invention, e.g., an incandescent electric lamp having a color temperature of 2800 K, a fluorescent lamp having color temperature of 4300 K, and four types of Day-lights having color temperatures of 5000 K, 5500 K, 6500 K and 7500 K.

Figure 6:
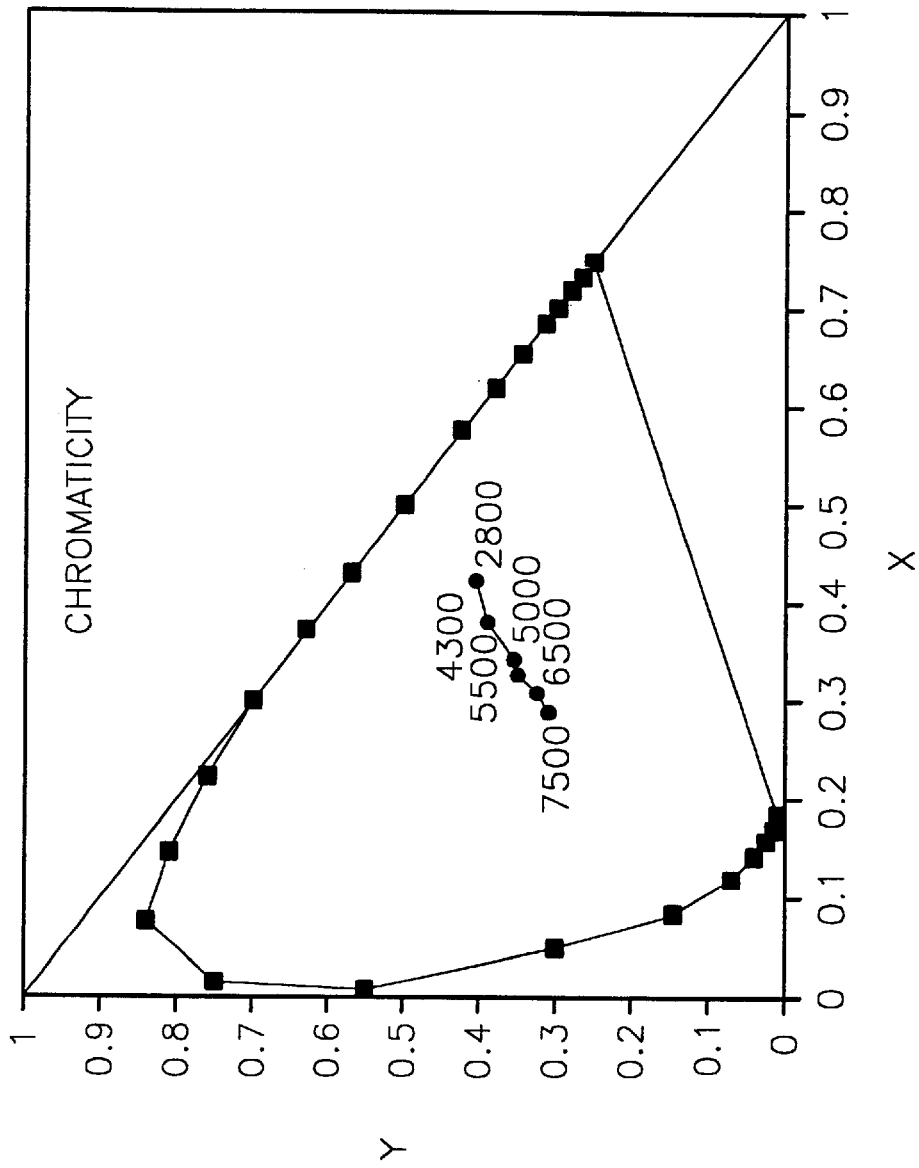
FIG. 6 is a chromaticity graph of color temperatures of representative illuminant adopted by the color image processing device according to the embodiment of the present invention.

Color temperatures of the representative illuminants are shown in chromaticity diagram of FIG. 6. Referring to FIG. 6, the six illuminant colors are denoted by color coordinate in different locations, which means that color components of the illuminant are different.

TABLE 1

|      | X      | Y      | Z      | x    | y    |
|------|--------|--------|--------|------|------|
| 2800 | 109.74 | 100.00 | 35.54  | 0.45 | 0.41 |
| 4320 | 98.83  | 100.00 | 55.78  | 0.39 | 0.39 |
| 5000 | 96.35  | 100.00 | 82.41  | 0.35 | 0.36 |
| 5500 | 95.61  | 100.00 | 92.01  | 0.33 | 0.35 |
| 6500 | 94.97  | 100.00 | 108.71 | 0.31 | 0.33 |
| 7500 | 94.90  | 100.00 | 122.41 | 0.30 | 0.32 |

The representative color temperatures of six illuminant used for the scene image illuminant and XYZ coordinate values and xy coordinate values thereof are shown in Table 1. For instance, in the XYZ values of the incandescent electric lamp having color a temperature of 2800 K and the sunlight having a color temperature of 7500 K, there are differences of 10 or more percent in the X values and 70 or more percent in the Z values.

Meanwhile, for conversion of the signals in RGB space to signals in XYZ space, the definition of a transfer function matrix A calculated by the XYZ values of the RGB primary color and the XYZ values of the illuminant is required.

$$\begin{bmatrix} X \\ Y \\ Z \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} R \\ G \\ B \end{bmatrix} \quad (2)$$

The XYZ values of the three primary colors of RGB may be different due to various filters of a camera or an image scanner, but it is preferred to design a filter having a spectral sensitivity similar to the XYZ spectral sensitivity so that it is prefer to use one of the primary colors of RGB of CCIR 601 or CCIR 709 which are standardized in the related art.

TABLE 2

| color | chromatic coordinates | | |
|-------|------|------|------|
| Red   | x1 | y1 | z1 |
| Green | x2 | y2 | z2 |
| Blue  | x3 | y3 | z3 |
| White | x0 | y0 | z0 |

In Table 2, the white illuminant indicates a scene illuminant, and the illuminant color of the scene is variable and the amount of change may be great, so that Formula 2 cannot be defined. However, most of illuminant colors can be defined as one of the six representative illuminant colors used for the present invention. The number of the illuminant colors may be increased or reduced if necessary. If an incandescent lamp with a color temp of 2800 K is used as an illuminant, formula 2 could be represented by formula 3.

$$\begin{bmatrix} X_{28} \\ Y_{28} \\ Z_{28} \end{bmatrix} = \begin{bmatrix} R2X \\ 2800 \end{bmatrix} \begin{bmatrix} R \\ G \\ B \end{bmatrix} \quad (3)$$

Formula 3 can be transformed into formula 4 and 5.

$$\begin{bmatrix} X \\ Y \\ Z \end{bmatrix} = \begin{bmatrix} \frac{X_w}{X_{w_{28}}} & & \\ & \frac{Y_w}{Y_{w_{28}}} & \\ & & \frac{Z_w}{Z_{w_{28}}} \end{bmatrix} \begin{bmatrix} X_{28} \\ Y_{28} \\ Z_{28} \end{bmatrix} = \begin{bmatrix} \frac{W}{W_{28}} \end{bmatrix} \begin{bmatrix} X_{28} \\ Y_{28} \\ Z_{28} \end{bmatrix} \quad (4)$$

$$\begin{bmatrix} X \\ Y \\ Z \end{bmatrix} = \begin{bmatrix} \frac{X_w}{X_{w_{28}}} & & \\ & \frac{Y_w}{Y_{w_{28}}} & \\ & & \frac{Z_w}{Z_{w_{28}}} \end{bmatrix} \begin{bmatrix} R2X \\ 2800 \end{bmatrix} \begin{bmatrix} R \\ G \\ B \end{bmatrix} \quad (5)$$

Further, in a similar way, if fluorescent light with a color temperature of 4300 K or day-light with a color temperature of 5000, 5500, 6500, and 7500 K are used as an illuminant, formula 2 can be represented by formula 6.

$$\begin{bmatrix} X \\ Y \\ Z \end{bmatrix} = \begin{bmatrix} \frac{\omega}{\omega_{43}} \end{bmatrix} \begin{bmatrix} R2X \\ 4300 \end{bmatrix} \begin{bmatrix} R \\ G \\ B \end{bmatrix} \quad (6\text{-}1)$$

$$\begin{bmatrix} X \\ Y \\ Z \end{bmatrix} = \begin{bmatrix} \frac{\omega}{\omega_{50}} \end{bmatrix} \begin{bmatrix} R2X \\ 5000 \end{bmatrix} \begin{bmatrix} R \\ G \\ B \end{bmatrix} \quad (6\text{-}2)$$

$$\begin{bmatrix} X \\ Y \\ Z \end{bmatrix} = \begin{bmatrix} \frac{\omega}{\omega_{55}} \end{bmatrix} \begin{bmatrix} R2X \\ 5500 \end{bmatrix} \begin{bmatrix} R \\ G \\ B \end{bmatrix} \quad (6\text{-}3)$$

$$\begin{bmatrix} X \\ Y \\ Z \end{bmatrix} = \begin{bmatrix} \frac{\omega}{\omega_{65}} \end{bmatrix} \begin{bmatrix} R2X \\ 6500 \end{bmatrix} \begin{bmatrix} R \\ G \\ B \end{bmatrix} \quad (6\text{-}4)$$

$$\begin{bmatrix} X \\ Y \\ Z \end{bmatrix} = \begin{bmatrix} \frac{\omega}{\omega_{75}} \end{bmatrix} \begin{bmatrix} R2X \\ 7500 \end{bmatrix} \begin{bmatrix} R \\ G \\ B \end{bmatrix} \quad (6\text{-}5)$$

Figure 7:
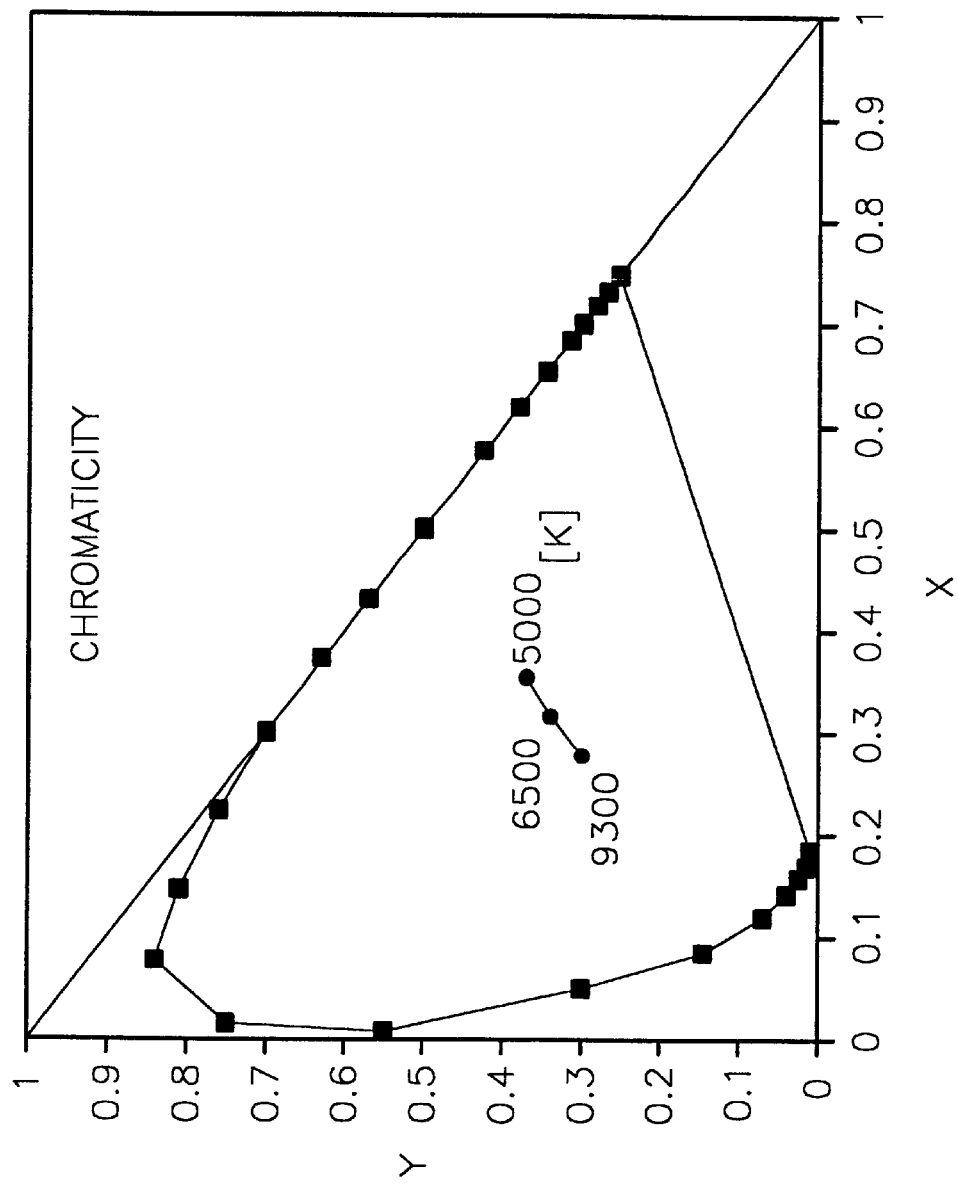
FIG. 7 is a chromaticity graph of color temperatures of monitors adopted by the color image processing device according to the embodiment of the present invention.

Referring to FIG. 7, the color temperatures of the monitor adopting the color image processor according to the present invention are denoted by coordinates in different locations of a chromaticity diagram. Three types of color temperatures, 5000 K, 6500 K and 9300 K, which are widely used by many monitors are shown in the XY chromatic coordinate.

TABLE 3

|      | X     | Y      | Z      | x    | y    |
|------|-------|--------|--------|------|------|
| 5000 | 96.32 | 100.00 | 82.49  | 0.35 | 0.36 |
| 6500 | 95.04 | 100.00 | 108.89 | 0.31 | 0.33 |
| 9300 | 95.30 | 100.00 | 141.27 | 0.28 | 0.30 |

In Table 3, the representative color temperatures used for the monitor, and XYZ and xy coordinate value thereof are shown in Table 3. That is, XYZ tristimulus values and xy chromatic coordinate values for monitors having color temperatures of three types are shown. For color temperatures of 5000 K and 9300 K of Table 3, a difference in color temperature on the X-axis is small, but the difference on Z-axis is relatively large.

The process for white-transformation, which transforms signals in an XYZ space to signals in RGB space, can be represented as the matrix equation of formula 7. In matrix equation of formula 7, three different color temperatures (5000 K, 6500 K, 9300 K) are used for determining matrix coefficients.

$$\begin{bmatrix} R \\ G \\ B \end{bmatrix} = \begin{bmatrix} R2X \\ 5000 \end{bmatrix}^{-1} \begin{bmatrix} X \\ Y \\ Z \end{bmatrix} \qquad (7\text{-}1)$$

$$\begin{bmatrix} R \\ G \\ B \end{bmatrix} = \begin{bmatrix} R2X \\ 6500 \end{bmatrix}^{-1} \begin{bmatrix} X \\ Y \\ Z \end{bmatrix} \qquad (7\text{-}2)$$

$$\begin{bmatrix} R \\ G \\ B \end{bmatrix} = \begin{bmatrix} R2X \\ 9300 \end{bmatrix}^{-1} \begin{bmatrix} X \\ Y \\ Z \end{bmatrix} \qquad (7\text{-}3)$$

In the above-described process, eighteen images are simultaneously or sequentially displayed on the monitor according to the types of color temperature characteristic to the monitor and the illuminant color of the actual scene, and a user selects an image having color distribution similar to the actual scene image so that an optimum illuminant color and the display color temperature are determined to match the colors between the actual scene and the reproduced image of the scene.

Figure 8A:
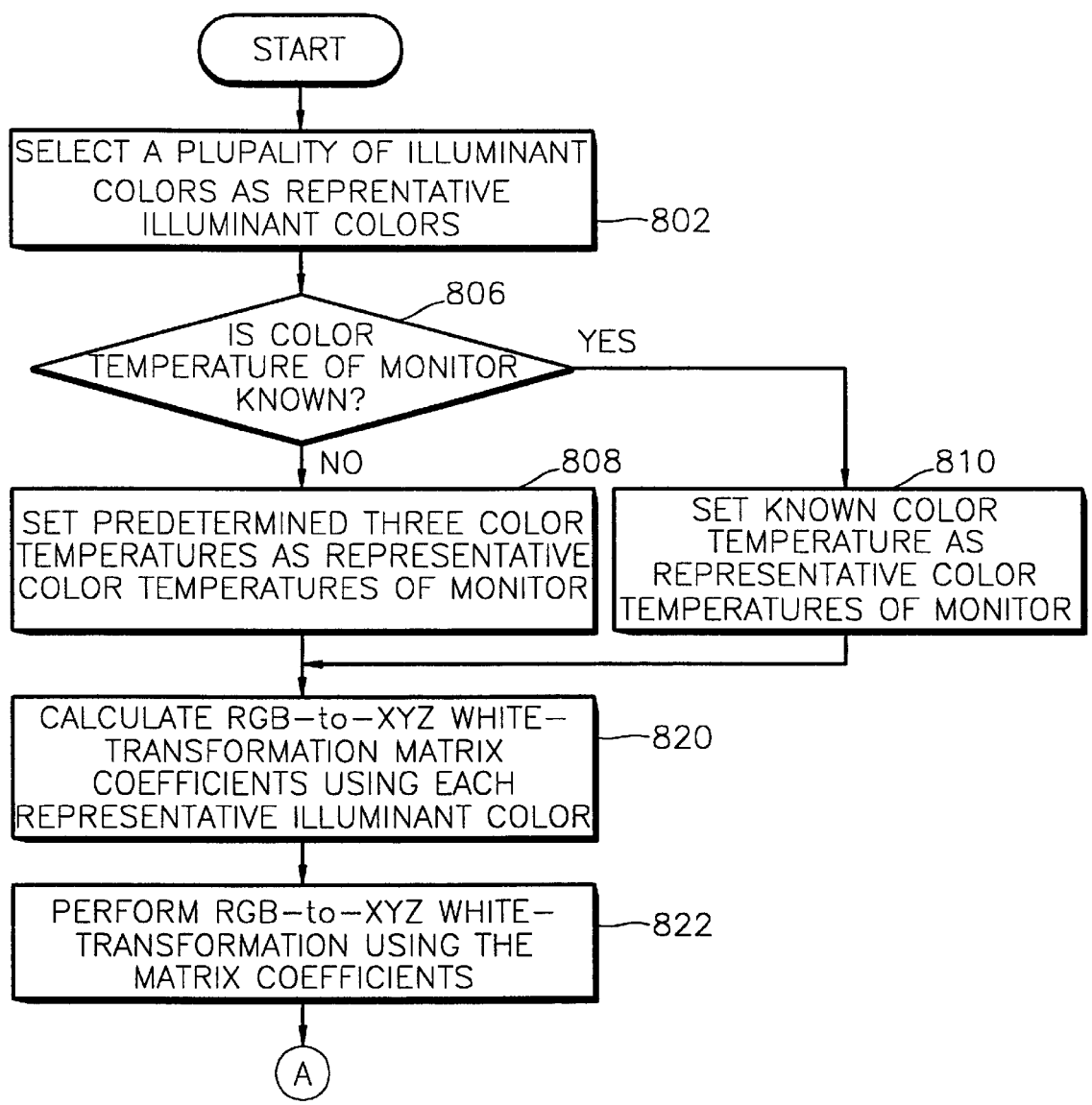
FIG. 8 is a flowchart showing the major steps of the color image processing method according to the embodiment of the present invention.

The main steps of the method for processing color images used by the color image processor are shown in FIG. 8. Referring to FIG. 8, the method for processing color images according to the present invention includes step 802 of selecting the representative illuminant colors illuminating an object. In this embodiment, illuminant colors corresponding to the color temperature of 2800 K, 4300 K, 5000 K, 5500 K, 6500 K, and 7500 K are selected as representative illuminant colors. These illuminant colors preferably have color differences which can be easily distinguished by the human eye, and preferably are used in ordinary. It is possible to use subdivide the above illuminant colors into more illuminant colors, but in this case, more emphasis has been given to visual distinguishableness.

Next, step (806) for deciding whether one knows the color temperature of a monitor is performed. If it is determined that one does not know color temperature of the monitor in step 806, step 808 for configuring color temperatures of 5000 K, 6500 K, and 9300 K as three representative color temperatures of the monitor. If it is determined that one knows the color temperature of the monitor in step 806, the known color temperature of monitor is used. Here, CCIR 601 can be used as color space for the representation of the XYZ tristimulus values or XY chromaticity coordinate values.

Next, RGB-XYZ white-transformation matrix coefficients are calculated in step 820 using each selected representative illuminant color. Then, RGB-to-XYZ white-transformation is performed in step 822. Also, XYZ-to-RGB white-transformation matrix coefficients are calculated in step 824 using each selected representative color temperature. Then, XYZ-to-RGB white-transformation is performed in step 826. Following this, the plurality of white-transformed images are displayed on the display in step 828. Finally, the user selects the most chromatically similar image or preferred image in step 830.

Thus, eighteen different images are simultaneously or sequentially displayed on the monitor according to the color temperature of the monitor and the illuminant color of the scene, and the user selects an image having a color distribution similar to that of the actual scene so that the illuminant color and display color temperature are determined which best match the color of the actual scene and the reproduced image of the actual scene.

The above-described process of white-transformation will be expressed by Formula 8.

$$\begin{bmatrix} R_0 \\ G_0 \\ B_0 \end{bmatrix} = \begin{bmatrix} RGB - RGB \\ whiteconv \end{bmatrix} \begin{bmatrix} R_i \\ G_i \\ B_i \end{bmatrix} = \begin{bmatrix} XYZ \rightarrow RGB \\ W_D \end{bmatrix} [W_S \rightarrow W_R] \begin{bmatrix} RGB \rightarrow XYZ \\ W_S \end{bmatrix} \begin{bmatrix} R_i \\ G_i \\ B_i \end{bmatrix} \qquad (8)$$

Here, $W_S$ denotes a scene illuminant color, $W_R$ denotes a reference illuminant color for image reproducing, and $W_D$ denotes the color temperature of a monitor. Thus, when an image which best matches the actual scene is selected as the reproduced image, variables for the three white points (illuminant color or color temperature) are determined, so that the illuminant color $W_S$ illuminated to the scene can be extracted.

In the above described preferred embodiment, it is prefer to use illuminant colors frequently used in surrounding environment as representative illuminant colors. However, alternatively, when the color temperature $T_C$ of the illuminant is known it is possible to use the illuminant color as representative illuminant color using an expression of converting the illuminant color temperature $T_C$ to the reference color space (chroma value xy) as follows.

$$x = -4.607\frac{10^9}{T_c^3} + 2.9678\frac{10^6}{T_c^2} + \qquad (9\text{-}1)$$

$$0.09911\frac{10^3}{T_c} + 0.244063 \text{(when, } T_c < 7000)$$

$$= -2.0064\frac{10^9}{T_c^3} + 1.9018\frac{10^6}{T_c^2} + \qquad (9\text{-}2)$$

$$0.24748\frac{10^3}{T_c} + 0.23704 \text{(When, } T_c \geq 7000)$$

$$y = -3.0x^2 + 2.87x - 0.275 \qquad (9\text{-}3)$$

As described above, according to the invention for the estimation of illuminant colors of an illuminant illuminating an object in a scene (scene illuminant) and the display color temperature of an image output device, the scene illuminant is white-transformed using illuminant having various illuminant color and the formed images are selected by a user, so that the user can obtain a natural color image or an image of a desired color even when the user does not know the illuminant. Also, information on the scene illuminant of the image photographed through the process can be obtained.

Also, according to the method of the present invention, precision and stability are more effective regardless of the type of the illuminant, the set color temperature of the image output device, complication of hardware, limits in components of images, or complexity of objects in the actual scene, and the method can be realized by hardware or software. Thus, the present invention can be widely adopted by the image processing systems, color cameras, and color imaging software.

According to the color image processor of the present invention, the light source is converted using the illuminant having various color temperatures to estimate the illuminant colors of the illuminant illuminating an object and a display color temperature of the image output device, and the image formed by the above process is selected, so that a visually natural color image or an image having a preferred color distribution can be obtained without information on the illuminant.

What is claimed is:

1. A color image processing apparatus, which receives RGB signals output from an image input device and processes the received RGB signals to thereby output images to a display means, comprising:
   a color conversion unit for white-transforming signals in RGB space;
   wherein, the color conversion unit includes,
   a first white-transforming means for white-transforming signals in RGB space to signals in a predetermined color space using N predetermined illuminant colors; and
   a second white-transforming means for white-transforming the signals in the predetermined color space to the signals in RGB space using M predetermined color temperatures of the display means.

2. The color image processor of claim 1, wherein the color image processing apparatus further comprises:
   a first frame memory means for buffering the received RGB signals and outputting the buffered signals;
   an image sampling unit for receiving the RGB signals output from the first frame memory means and down-sampling the received RGB signals and further outputting a down-sampled RGB signals; and
   a second frame memory means for buffering the down-sampled RGB signals and outputting the buffered down-sampled RGB signals.

3. The color image processor of claim 1, wherein the color conversion unit comprises:
   a first operation unit including N matrix operators connected in parallel to calculate matrices for white-transformation of the signals in RGB space to signals in predetermined color space using N predetermined illuminant colors.

4. The color image processor of claim 3, wherein the color conversion unit further comprises:
   a second operation unit including M matrix operators connected in parallel to calculate matrices for white-transformation of the signals in the predetermined color space to the signals in RGB space using each M predetermined color temperature.

5. The color image processor of claim 1, wherein the color conversion unit comprises:
   a first memory for storing information of the matrices for performing white-transformation of the signals in RGB space to the signals in a predetermined color space using N predetermined illuminant colors, and outputting the information in response to a first control signal; and
   a first matrix operation unit for operating the matrices in accordance with the information output from the first memory.

6. The color image processor of claim 5, wherein the color conversion unit further comprises:
   a second memory for storing information of the matrices for performing white-transformation the signals in the predetermined color space to the signals in a RGB color space using M predetermined color temperature for display means, and outputting the information in response to a second control signal; and
   a second matrix operation unit for operating the matrices in accordance with the information output from the second memory.

7. The color image processor of claim 3, wherein the predetermined color space is a standard color space.

8. The color image processor of claim 3, wherein the predetermined space is a color space which has a relationship that the magnitude of the transformed signal in the color space and the magnitude of signal in original color space is linear.

9. The color image processor of claim 3, wherein the predetermined color space is a color space selected from a group of standard color spaces recommended by CIE, CIEXYZ, CIEUVW, and color spaces adopts UV chromaticity coordinate space and Y, R-Y, B-Y coordinate space.

10. The color image processor of claim 3, wherein the N predetermined representative illuminant colors of the color conversion unit are obtained by selecting at least one color temperature from a group consisting of 2800 K, 4300 K, 5000 K, 5500 K, 6500 K, and 7500 K, which can be easily distinguished by person's eyes.

11. The color image processor of claim 1, wherein the color conversion unit converts a light source using Formula 9, when the color temperature of the illuminant is known.

12. The color image processor of claim 4, wherein the predetermined color space is a standard color space.

13. The color image processor of claim 5, wherein the predetermined color space is a standard color space.

14. The color image processor of claim 6, wherein the predetermined color space is a standard color space.

15. The color image processor of claim 4, wherein the predetermined space is a color space which has a relationship that the magnitude of the transformed signal in the color space and the magnitude of signal in original color space is linear.

16. The color image processor of claim 5, wherein the predetermined space is a color space which has a relationship that the magnitude of the transformed signal in the color space and the magnitude of signal in original color space is linear.

17. The color image processor of claim 6, wherein the predetermined space is a color space which has a relationship that the magnitude of the transformed signal in the color space and the magnitude of signal in original color space is linear.

18. The color image processor of claim 4, wherein the predetermined color space is a color space selected from a group of standard color spaces recommended by CIE, CIEXYZ, CIEUVW, and color spaces adopts UV chromaticity coordinate space and Y, R-Y, B-Y coordinate space.

19. The color image processor of claim 5, wherein the predetermined color space is a color space selected from a group of standard color spaces recommended by CIE, CIEXYZ, CIEUVW, and color spaces adopts UV chromaticity coordinate space and Y, R-Y, B-Y coordinate space.

20. The color image processor of claim 6, wherein the predetermined color space is a color space selected from a group of standard color spaces recommended by CIE, CIEXYZ, CIEUVW, and color spaces adopts UV chromaticity coordinate space and Y, R-Y, B-Y coordinate space.

21. The color image processor of claim 4, wherein the N predetermined representative illuminant colors of the color conversion unit are obtained by selecting at least one color temperature from a group consisting of 2800 K, 4300 K, 5000 K, 5500 K, 6500 K, and 7500 K, which can be easily distinguished by person's eyes.

22. The color image processor of claim 5, wherein the N predetermined representative illuminant colors of the color conversion unit are obtained by selecting at least one color temperature from a group consisting of 2800 K, 4300 K, 5000 K, 5500 K, 6500 K, and 7500 K, which can be easily distinguished by person's eyes.

23. The color image processor of claim 6, wherein the N predetermined representative illuminant colors of the color conversion unit are obtained by selecting at least one color temperature from a group consisting of 2800 K, 4300 K, 5000 K, 5500 K, 6500 K, and 7500 K, which can be easily distinguished by person's eyes.

24. A color image processing method by which first RGB signals output from an image input device are received and the image is processed to output the processed image to a display means, comprising steps of:

(a) white-transforming signals in RGB space using N predetermined illuminant colors;

(b) displaying a plurality of images by the white-transformed signal on the display means;

(c) selecting the most visually preferred image from the images; and (d) determining the illuminant color corresponding to the selected image in step (c) as optimum illuminant color.

25. The color image processing method of claim 24, wherein the step (a) includes:

(a-1) white-transforming signals in RGB space to signals in a predetermined color space using N predetermined illuminant colors; and (a-2) white-transforming the signals in the predetermined color space to the signals in RGB space using M predetermined color temperatures.

26. The color image processing method of claim 24, wherein the N predetermined representative illuminant colors in step (a) are obtained by selecting at least one color temperature from the group consisting of 2800 K, 4300 K, 5000 K, 5500 K, 6500 K, and 7500 K, which can be easily distinguished by men's eyes, and are frequently used in routine life.

27. The color image processing method of claim 24, wherein the predetermined space in step (a) is a color space which has a relationship that the magnitude of transformed signal in the color space and the magnitude of signal in original color space is linear.

28. The color image processing method of claim 24, wherein the predetermined color space in step (a) is a color space selected from the group of standard color spaces recommended by CIE, CIEXYZ, CIEUVW, and color spaces adopt UV chromaticity coordinate space and Y, R-Y, B-Y coordinate space.

* * * * *